Dec. 26, 1961    P. E. STERN    3,014,251
THERMAL ENERGY RECOVERY AND TRANSFER DEVICE
FOR DEICING AND OTHER PURPOSES
Filed July 6, 1959
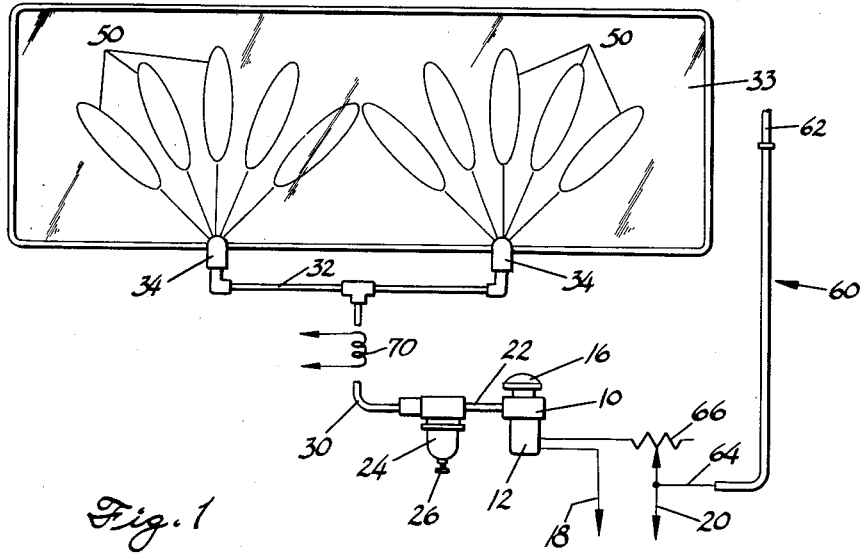
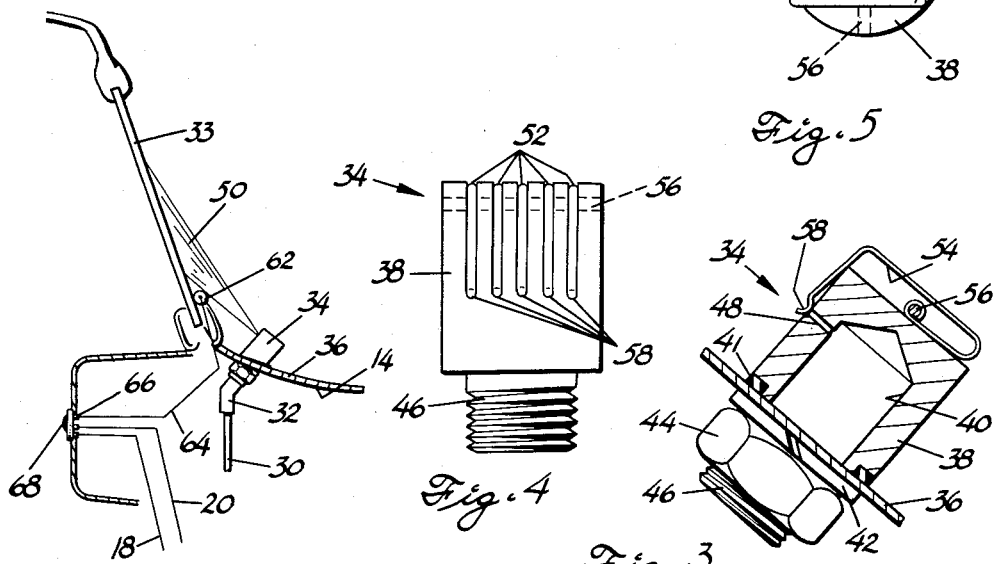
INVENTOR.
PATRICIA E. STERN
BY
Dale A. Winnie
ATTORNEY

United States Patent Office 3,014,251
Patented Dec. 26, 1961

3,014,251
THERMAL ENERGY RECOVERY AND TRANSFER DEVICE FOR DEICING AND OTHER PURPOSES
Patricia E. Stern, 39 Thorpe, Pontiac, Mich.
Filed July 6, 1959, Ser. No. 825,026
10 Claims. (Cl. 20—40.5)

This invention relates to thermal energy recovery and transfer devices in general and more particularly to means for recovering heat energy from the available air and transferring such heat for useful purposes.

There are numerous uses for thermal energy producing or recovering devices; such as for deicing purposes, preheaters, dehydrators, etc. One prevalent example of a use for such devices is in the cleaning and deicing of the windshields of land, air and sea vehicles where constant unobstructed visibility is essential.

The problem of keeping automotive vehicle windshields clean and free of ice, in the winter, is within everyone's experience. The commonly known method of keeping a vehicle windshield clean requires the use of oscillating windshield wipers and a hot air defrosting system using heated air from the vehicle compartment heating system. Neither of these cleaning and defrosting methods have proven themselves suitable for their intended purpose despite year-by-year efforts to improve such systems.

It is an object of this invention to disclose a pneumatic thermal velocity system using the available heat energy in the surrounding air to prevent and/or eliminate the formation of ice on a surface susceptible thereto. For illustration purposes the disclosed system will be discussed as regards the problem of vehicle windshileds.

It is an object of this invention to teach the use of air suitably compressed or otherwise having the volumetric character thereof changed to increase the thermal character thereof and pressurized or otherwise motivated to flow towards and over a working area to perform a desired task.

The disclosed system makes use of a relatively small sized air compressor which may be housed within the motor compartment of a vehicle and from whence it may induct moderately preheated air. Through controlled compression of the air and other regulator means, a fingered spray pattern air of a suitable temperature is emitted over the surface of a vehicle windshield to prevent and/or eliminate the formation of ice thereon. The protective layer of air on the vehicle windshield may also serve to ward off bugs and insects as well as raindrops, which would otherwise collect on the windshield.

It is also an object of this invention to disclose a weather sensing operative interconnection with the working device to automatically regulate the thermal output thereof under variable weather conditions.

A further object of this invention is to disclose optional controls for seasonal regulation of the proposed system and for supplemental heat under extremely bad weather conditions.

These and other objects and advantages in the practice of this invention will be more apparent upon a reading of the following specification, in conjunction with the accompanying drawing, and in regard to a working embodiment of this invention.

In the drawing:

FIGURE 1 is a schematic illustration of the proposed system as used to clean vehicle windshields of ice, frost, and the like.

FIGURE 2 is a side plan view of part of the proposed windshield deicing system.

FIGURE 3 is an enlarged side plan view of the flow nozzle used in the proposed system and shows certain details of construction.

FIGURE 4 is a front elevational view of one of the flow nozzles of the proposed system.

FIGURE 5 is a top view of the flow nozzle.

Referring to the drawings in further detail:

A small sized air compressor 10, with a suitable drive motor 12 connected thereto, is disposed within the engine compartment 14 of a vehicle. An air filter 16 is provided on the induction side of the air compressor 10 to separate out impurities in the inducted air. An electrical source of power, such as from the generator, is connected by electrical leads 18 and 20 to the compressor drive motor 10.

With the air compressor 10 disposed in the vehicle engine compartment 14, it will be appreciated that the air inducted into the air compressor will be preheated to some extent. This is not essential to the operation of the disclosed system but is helpful in certain instances.

A flow conduit 22 connects the outlet side of the air compressor 10 to a combination filter and accumulator device 24. The filter portion is intended to remove any impurities that may have by-passed the first filter 16. The accumulator collects any moisture or condensate in the air received from the compressor. A petcock 26 may be employed to drain off the accumulator from time to time or other drainage means may be employed.

A flow conduit 30 is provided between the relief valve 28 and an air flow manifold 32. The air flow manifold extends parallel to the lower edge of the vehicle windshield 33 within the engine compartment 14, and has flow nozzles 34 provided at the ends thereof. The flow nozzles 34 extend through the cowl or hood 36 of the vehicle and are exposed in closely spaced and adjacent relation to the lower edge of the vehicle windshield 33.

The flow nozzles 34 comprise a cylindrical shaped housing 38 having an air collecting chamber 40 formed therein and accessible through the lower end of the housing. The nozzles 34 are received in shouldered engagement with the vehicle hood 36, on a gasket 41, and are retained by a lock washer 42 and threaded nut fastener 44 engaged to the externally threaded lower end 46 thereof.

A plurality of separate orifices 48, five in this instance, are formed through one side of the nozzle housing 34. They are radially disposed and communicate with the air chamber 40. As will be subsequently appreciated, the orifices 48 are formed and disposed to emit a stream or jet 50 of compressed and thereby heated air over the windshield 10. The disposition of the orifices 48 and the orientation of the nozzle housing 38 is such as will produce a spray pattern of fingered configuration, as shown, spanning a wide area of the windshield 10.

Separate orifice cover members 52 are provided on the nozzle members 34. Recesses or grooves 54 are formed within the top surface of the nozzle housing 38 to receive and retain the fastened end of the spring wire cover members 52 therein. A pin member 56 holds all of the cover members engaged in their respective slots or grooves. Each cover member includes a light finger end 58 which is lightly biased to cover one of the flow orifices 48. The pressure of the air emitted from the orifices 48 is ample to deflect the cover member out of the way.

A thermal control device 60 is operatively connected into the system thus far described by being connected into the power supply line 20 to the compressor drive motor 12. The thermal device 60 includes a temperature sensing member 62, such as a thermocouple, intended to be disposed in close proximity to the vehicle windshield 33. Such sensing member is thereby responsive to weather conditions at the windshield surface. The lead wire 64 from such sensing device 62 is connected to a rheostat 66 in the power line 20 and is thereby able to regulate the output of the air compressor 10.

A manually operative switch 68 may be incorporated with the rheostat control 66 to enable seasonal setting of the disclosed system, if desired, and to turn the system on and off.

An inductive or resistant type of heat transfer means, such as the coil 70, may be provided between the air compressor 10 and the flow nozzles 34 for added for supplemental heat capacity, if desired. Such an option might be used in particularly cold climates or in severe winter weather conditions.

Operation and use

When the disclosed system is in operation, air is inducted through the air filter 16 into the air compressor 10. The air filter 16 removes all undesirable foreign matter from the inducted air and prevents small abrasive particles from entering into the system where they might cause damage and reduce the serviceable life of the overall system. Such foreign matter could also obscure flow passages and adversely affect the operation and efficiency of the overall flow system.

The filtered air enters the air compressor 10 where its volume is appreciably reduced and the air pressure and temperature is accordingly increased. The compressor is designed to handle a given quantity of air and to suitably compress the air to raise the latent heat thereof sufficiently to melt ice and prevent its further formation.

The compression heated air passes from the air compressor 10 into the accumulator and secondary filter 24 from whence moisture and condensate may be extracted. The air then flows into the air manifold 32 and on to the air chambers 40 of the flow nozzles 34. The air is ultimately exhausted through the nozzle orifices 48, lifting the covers 52 in the course of such exhaustive flow, and produces a fingered spray pattern 50 on the windshield 33. The initial spray pattern forms a warm air blanket over the windshield suitable for melting ice and preventing the further formation of ice thereon.

The temperature sensing element 62, via the control rheostat 66, regulates the drive motor 12 and the thermal output of the air compressor 10. The manually selective control 68 provided with the rheostat further enables seasonal setting of the system so that the sensing element may serve as a form of micrometer adjustment thereover.

It will be appreciated that the compressor 10 and the flow nozzles 34 are designed to obtain a given rate of air flow for a desired escape velocity, distance of flow to the windshield, area to be covered, and without significant loss of pressure or temperature below that required to accomplish the desired task. Accordingly the size of the orifices 48 and the design characteristics of the compressor may vary with different systems.

While a preferred embodiment of this invention has been described, it is to be understood that certain modifications and improvements may be made thereto. Such of these modifications and improvements as incorporate the principles of this invention are to be considered as included in the hereinafter appended claims unless these claims by their language expressly state otherwise.

I claim:

1. The method of deicing vehicle windshields and other surfaces susceptible to icing and frost, comprising; inducting and compressing air to increase the pressure and temperature thereof, collecting and filtering off impurities and moisture in said inducted air, jetting the compression heated and pressurized air in a spray pattern over a surface to be deiced, and thermally regulating the operative efficiency of the air compressing means in accord with the icing condition on the ice susceptible surface.

2. The method of deicing vehicle windshields and other surfaces susceptible to icing and frost, comprising; inducting air from a preheated atmosphere, filtering said air to remove suspended impurities therefrom, compressing said air to increase the temperature and pressure condition thereof, accumulating and removing moisture and further impurities from the compressed air, jetting said air in a fingered spray pattern over a surface to be deiced, sensing the iced condition of the surface to be deiced, and thermally regulating said compression of air in accordance with the requirements of the surface to be deiced.

3. A system for cleaning vehicle windshields and other surfaces susceptible to the formation of ice and frost thereon, comprising; an air compressor having air inductive filtering means connected thereto, said compressor being adapted to raise the thermal rating of inducted air by compression thereof, an accumulator connected to the outlet side of said air compressor and receptive of moisture and condensate therefrom, and a flow nozzle connected to the outlet side of said accumulator and positioned in close proximity to a surface to be deiced, said flow nozzle including a plurality of separate orifices arranged to provide a fingered spray pattern of compression heated and pressurized air over said surface to be deiced.

4. A system for cleaning vehicle windshields and other surfaces susceptible to the formation of ice and frost thereon, comprising; an air compressor having air inductive filtering means connected thereto, said compressor being adapted to raise the thermal rating of inducted air by compression thereof, an accumulator connected to the outlet side of said air compressor and receptive of moisture and condensate therefrom, a flow nozzle connected to the outlet side of said accumulator and positioned in close proximity to a surface to be deiced, said flow nozzle including a plurality of separate orifices arranged to provide a fingered spray pattern of compression heated and pressurized air over said surface to be deiced, and a thermal regulator operatively connected to said compressor for monitoring the operating efficiency thereof and including a sensing means disposed to detect the iced condition of the surface to be cleaned.

5. A system for cleaning vehicle windshields and other surfaces susceptible to the formation of ice and frost thereon, comprising; an air compressor having air inductive filtering means connected thereto, said compressor being adapted to raise the thermal rating of inducted air by compression thereof, an accumulator connected to the outlet side of said air compressor and receptive of moisture and condensate therefrom, a flow nozzle connected to the outlet side of said accumulator and positioned in close proximity to a surface to be deiced, said flow nozzle including a plurality of separate orifices arranged to provide a fingered spray pattern of compression heated and pressurized air over said surface to be deiced, a thermal regulator operatively connected to said compressor for monitoring the operating efficiency thereof and including a sensing means disposed to detect the iced condition of the surface to be cleaned, and inductive heating means provided between said accumulator and said flow nozzle and selectively energized for supplementing the thermal output of said compressor under extreme icing conditions.

6. A device for cleaning and deicing vehicle windshields and other surfaces susceptible to the formation of ice and accumulation of air impurities thereon, comprising; a compressor receptive of filtered air, an accumulator connected to the outlet side of said compressor for separating condensate and impurities from the air flowing from said compressor, a thermal regulator operatively connected to said compressor, said regulator being disposed in a weather sensing location for independently monitoring the thermal output of said compressor, and a flow nozzle connected to the outlet side of said accumulator and closely adjacent the surface to be cleaned for jetting a protective and deicing flow of air thereover.

7. A device for cleaning and deicing vehicle windshields and other surfaces susceptible to the formation of ice and accumulation of air impurities thereon, comprising; a compressor receptive of filtered air, an accumulator connected to the outlet side of said compressor for separating condensate and impurities from the air flowing from said compressor, a temperature responsive means disposed in weather sensing location apart from said compressor and operatively connected thereto for variance of the thermal output thereof, manually operable weather setting means interposed between said temperature responsive means and said compressor for seasonal control of the system, and a flow nozzle connected to the outlet side of said accumulator and closely adjacent the surface to be cleaned for jetting a protective and deicing flow of air thereover.

8. A device for cleaning and deicing vehicle windshields and other surfaces susceptible to the formation of ice and accumulation of air impurities thereon, comprising; a compressor receptive of filtered air, an accumulator connected to the outlet side of said compressor for separating condensate and impurities from the air flowing from said compressor, a temperature responsive means disposed in weather sensing location apart from said compressor and operatively connected thereto for variance of the thermal output thereof, manually operable weather setting means interposed between said temperature responsive means and said compressor for seasonal control of the system, and a flow nozzle connected to the outlet side of said accumulator and closely adjacent the surface to be cleaned for jetting a protective and deicing flow of air thereover, said flow nozzle including a collective chamber and a plurality of radially directed orifices formed from said chamber through one side thereof, said orifices being arranged to produce a fingered spray pattern of pressurized and compression heated air over a surface to be maintained free of ice and other undesirables.

9. A device for cleaning and deicing vehicle windshields and other surfaces susceptible to the formation of ice and accumulation of air impurities thereon, comprising; a compressor receptive of filtered air, an accumulator connected to the outlet side of said compressor for separating condensate and impurities from the air flowing from said compressor, a thermal regulator operatively connected to said compressor, said regulator being disposed in a weather sensing location for independently monitoring the thermal output of said compressor, a flow nozzle connected to the outlet side of said accumulator and closely adjacent the surface to be cleaned for jetting a protective and deicing flow of air thereover, said flow nozzle including a collective chamber and a plurality of radially directed orifices formed from said chamber through one side thereof, said orifices being arranged to produce a fingered spray pattern of pressurized and compression heated air over a surface to be maintained free of ice and other undesirables, and flow lifted protective covers provided on said nozzle and disposed to close said orifices when inoperative.

10. A windshield cleaner and protective device for automotive and other vehicles, comprising; an air compressor disposed within the engine heated compartment enclosing the vehicle engine, air filtering means connected to the inlet side of said air compressor, power means for driving said compressor to increase the pressure and thereby the thermal condition of air received thereby, a filter and accumulator means connected to the outlet side of said compressor, a pressure responsive relief valve connected to the outlet of said filter and accumulator means, a flow passage manifold connected to the outlet side of said compressor through said relief valve and accumulator means, a pair of flow nozzles connected to said manifold and disposed in relative spaced relation next adjacent the weather exposed surface of a vehicle windshield, said nozzles each including a plurality of orifices formed therein and opening on the side thereof next adjacent said windshield, said orifices being relatively arranged in each nozzle to produce a fingered spray pattern of compression heated air on said windshield, a thermal regulating means operatively connected to said compressor and including a temperature sensing member disposed in weather exposed relation next adjacent said windshield, a manually operative season selective control connected between said thermal regulating means and said compressor, and a secondary heat supply source disposed between said compressor and said flow nozzles for supplemental heating of the windshield cleaning air flow therebetween.

References Cited in the file of this patent
UNITED STATES PATENTS

| | | |
|---|---|---|
| 767,624 | Bedell et al. | Aug. 16, 1904 |
| 1,102,336 | Heim et al. | July 7, 1914 |
| 1,448,508 | Thum | Mar. 13, 1923 |
| 2,109,718 | Bayers | Mar. 1, 1938 |